Figure 3:
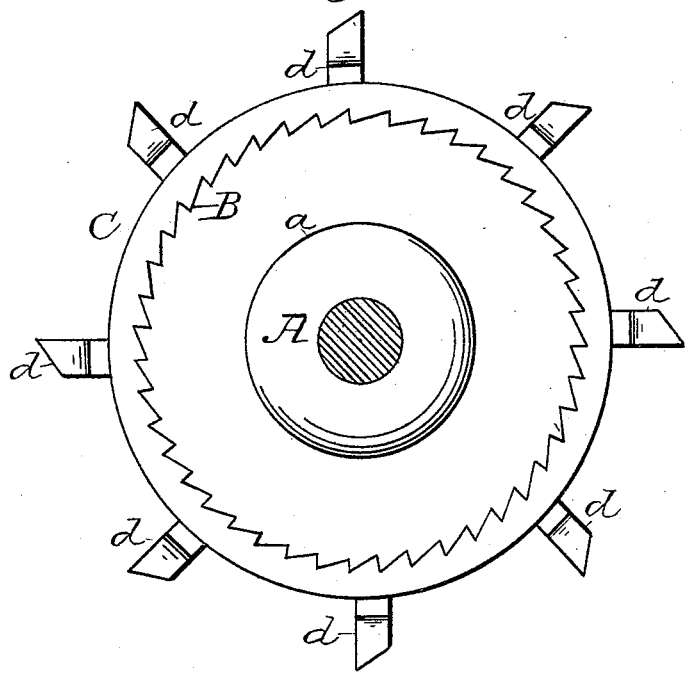

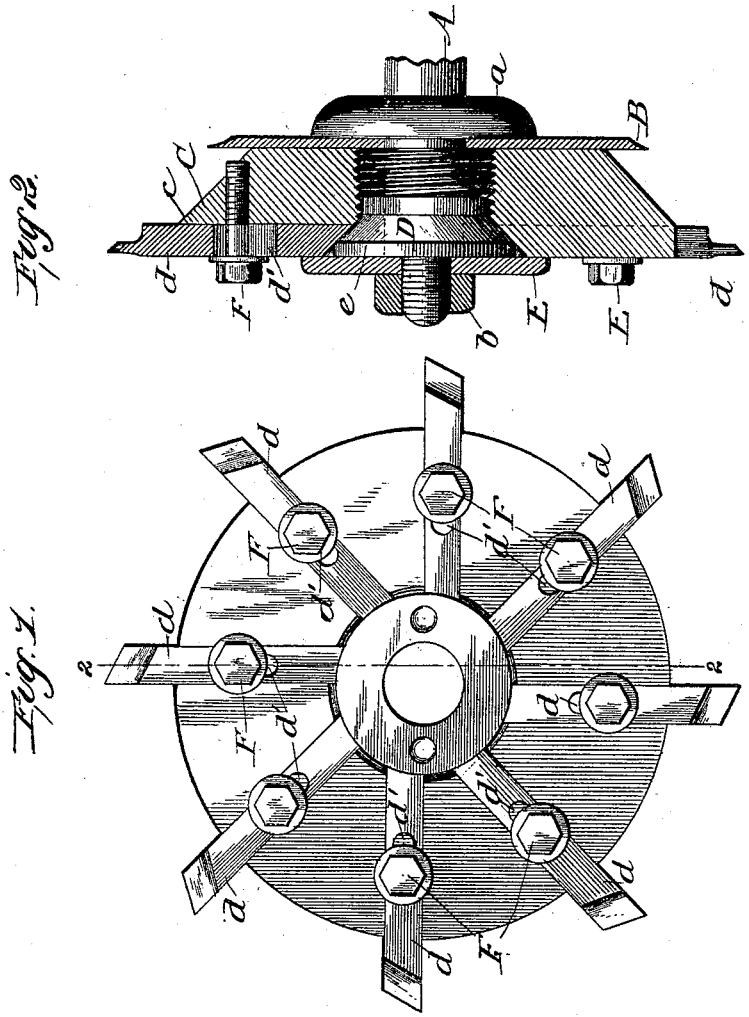

(No Model.) 2 Sheets—Sheet 2.
J. R. CUMMINGS.
COMBINED CIRCULAR CUTTER AND SAW.

No. 457,898. Patented Aug. 18, 1891.

Witnesses:
Gustave Erdmann.
Susie Carney.

Inventor:
John Raymond Cummings
By Frank D. Thomason
Atty

UNITED STATES PATENT OFFICE.

JOHN RAYMOND CUMMINGS, OF CHICAGO, ILLINOIS, ASSIGNOR TO THE AMERICAN PRESS ASSOCIATION, OF SAME PLACE.

COMBINED CIRCULAR CUTTER AND SAW.

SPECIFICATION forming part of Letters Patent No. 457,898, dated August 18, 1891.

Application filed October 31, 1890. Serial No. 369,915. (No model.)

*To all whom it may concern:*

Be it known that I, JOHN RAYMOND CUMMINGS, of Chicago, Cook county, Illinois, have invented certain new and useful Improvements in a Combined Circular Cutter and Saw, of which the following is a full, clear, and exact description, reference being had to the accompanying drawings, and to the letters of reference marked thereon.

The object of my invention is to provide a rotary cutter-head and saw, the knives of the former being adjustable radially simultaneously by the mere act of tightening a nut, and the said cutter-head and saw being especially adapted for use in a stereotype grooving and trimming machine constructed and operating similar to that for which I am about to make application for Letters Patent of the United States therefor, substantially as hereinafter fully described, and as illustrated in the drawings, in which—

Figure 1 is a side elevation of my invention, showing the arbor nut and washer removed; and Fig. 2 is a transverse vertical section therethrough, taken on dotted line 2 2, Fig. 1. Fig. 3 is a side elevation of my invention, looking at the side opposite that shown in Fig. 1.

In the drawings, A represents a shaft or end of a shaft having an arbor $a$ secured thereon and having placed flat against said arbor a circular saw B. This saw is held in place against said arbor by the circular cutter-holder C and the spreading-boss D tapped into the center of said holder. The boss D has the shaft passing through its center, and said boss and holder are held in place on said shaft, so as to secure said saw, by a washer E, and the nut $b$, screwed onto the screw-threaded end or other portion of said shaft. In the face of said holder, opposite saw B, I make a suitable number of radial or nearly radial grooves $c$, which extend from the central opening thereof to its periphery, and in each of these grooves $c$ I place a cutter or knife $d\ d$, the outer ends of all of which extend past the periphery of the holder a corresponding distance. Boss D is of a length corresponding, preferably, to about the thickness of the holder, and its end farthest from the saw is provided with a head $e$, whose inner shoulders are beveled like the head of a common spool, and the central hole in the holder, into which the boss is screwed, is countersunk, so that its walls correspond to the bevel of the shoulders of said boss and provide a seat therefor. Now, in practice, the inner end of the knives is beveled, preferably, so as to correspond to the angle of and oppose the bevel of the shoulders of the head. When secured in their grooves by the bolt F, passing through the longitudinally-elongated slot $d'$ therein, they are adjusted radially inward until their inner beveled ends touch said boss D. The said boss is then screwed into the holder, and as it moves inward its beveled shoulders push the cutters or knives simultaneously outward, care having been first taken to loosen bolts F, so as to permit them to move. After being properly adjusted bolts F are tightened, so as to secure the knives in their adjusted position, and then washer E is placed in position, as shown, and nut $b$ tightened.

So far as the broad combination of the saw B and the cutters or knives $d$ is concerned, the latter may be capable of occupying but one position, or they may be capable of adjustment by hand instead of by the means I have shown for adjusting them. I prefer the use of such or of similar means, however. The relative radius of the cutting-edges of the cutter $d$ and the saw B may likewise be changed from that which is shown in the drawings, and the saw may have the greatest diameter without departing from the spirit of my invention.

What I claim is—

1. The combination, with a cutter-head consisting of a holder and radial cutters or knives held thereby, of a rotary saw, as set forth.

2. The combination, with a cutter-head consisting of radially-adjustable cutters and a holder therefor, of a circular saw, as set forth.

3. The combination, with a cutter-head consisting of simultaneously radially-adjustable cutters and a holder therefor, of a circular saw, as set forth.

4. The combination of a holder C, having radial grooves in one side, cutters placed and adjusted therein, and a boss tapped into a central opening in said holder and having a head, the inner shoulders of which are beveled, as set forth.

5. The combination of a holder C, having radial grooves in one side and having a central countersunk opening therein, cutters placed and adjusted in said grooves, and a boss tapped into a central opening in said holder, which has an enlarged head, the inner shoulders of which are beveled so as to fit within the countersunk central opening of said holder, as set forth.

6. The combination, with a shaft $a$, having a portion thereof screw-threaded, a holder C, having a countersunk central opening therethrough and having radial grooves on one side thereof, cutters $d$, having longitudinally-elongated slots $d'$, and bolts F, of the boss D, tapped into the central opening of said holder and having a head, the shoulders of which are beveled to fit into the countersink of said opening, washer E, and nut $b$, as set forth.

JOHN RAYMOND CUMMINGS.

Witnesses:
EDW. F. ARCHIBALD,
CHAS. H. EVANS.